Figure 1:
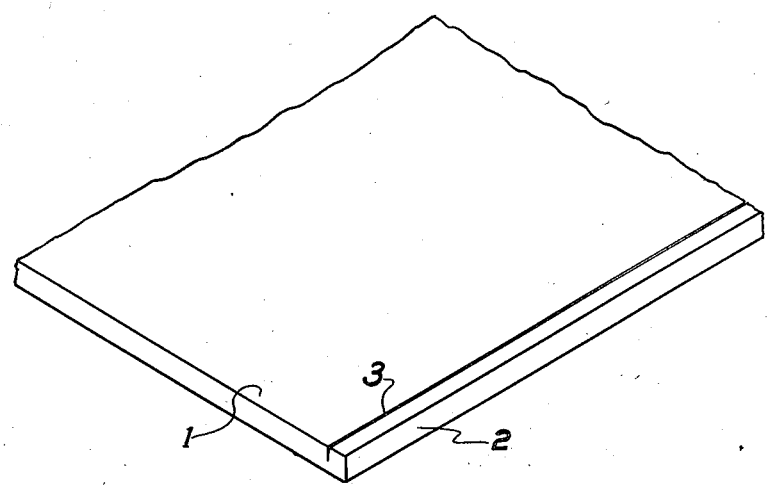
Figure 2:
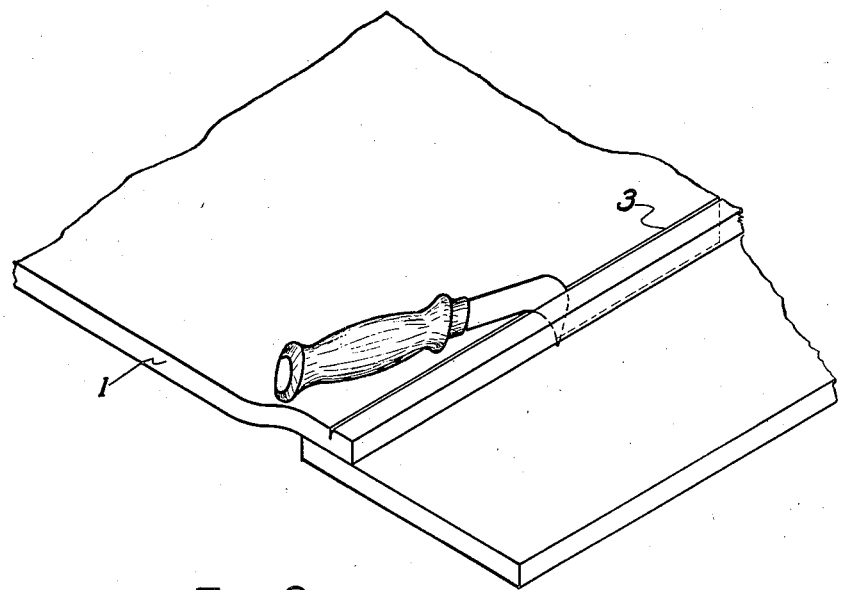

April 30, 1935.  R. K. AUSTIN  1,999,856

LINOLEUM SEAM CUTTING GUIDE

Filed Aug. 10, 1932

INVENTOR
ROGER K. AUSTIN
BY
Gordon C. Willard
ATTORNEY

UNITED STATES PATENT OFFICE 1,999,856

LINOLEUM SEAM-CUTTING GUIDE

Roger K. Austin, Avon-by-the-Sea, N. J., assignor to Congoleum-Nairn, Inc., a corporation of New York Application August 10, 1932, Serial No. 628,143

1 Claim. (Cl. 154—42)

The present invention relates to an improvement in linoleum or similar surface covering which is adapted to be installed in webs or strips, the edges of contiguous strips forming abutting joints.

In installing linoleum according to the method commonly used, the juncture between contiguous strips is usually formed by lapping the edge of one strip or web over the edge of the adjacent strip and, with a sharp knife, manually cutting through both thicknesses of the double layer so that the two cut edges will closely abut, forming a tight joint. Such practice is laborious and the character of the resulting seam, particularly as to whether it is straight, true, and close fitting, depends largely upon the skill of the mechanic.

The object of the present invention is to provide an improved linoleum or similar surface covering which is prepared, at the time of its manufacture, with a seam-cutting guide, whereby straight and close fitting seams are assured in all cases, and whereby a considerable saving is effected in the labor of installing linoleum thus prepared.

The invention in its preferred form comprises linoleum or the like, provided with a preformed straight groove or cut, extending along one or both edges of the material, but spaced inwardly therefrom. Figure I illustrates such preferred embodiment indicating the location of the seam guide 3 with respect to the normal edge 2 of the goods. If desired, seam guides 3 may be formed adjacent both longitudinal edges of the goods. From a practical standpoint, however, a single seam guide, adjacent one edge, will usually be found sufficient, since when installing such improved linoleum, the opposite edge of the goods will be placed beneath that edge of a contiguous strip which is itself provided with a seam guide. Figure II illustrates clearly how successive adjacent strips will be positioned when an installation of the improved linoleum is to be made. Utilizing the preformed cut or groove as a guide, the ordinary mechanic is able to cut and form straight, true, close fitting seams. Furthermore, the groove or cut, extending partially through the upper layer of the overlapping linoleum, lessens the labor of the cutting of the seam and expedites the entire operation.

The seam guide may be applied at any convenient point in process of the manufacture of the linoleum or other surface covering. Preferably it is applied at the time of the final inspection of the goods just before packaging, or at the time the goods are usually trimmed to size. The usual equipment employed in trimming the goods may, by adjustment of the cutting knife to secure the proper depth of groove, be utilized to advantage in forming the guide. It will be observed, however, that when employing the seam guide of my invention it becomes unnecessary to trim the edges of the linoleum to form a square, true surface, since, when the linoleum is installed, the narrow strip of material between the edge 2 and the seam guide 3 will be cut off and discarded.

Although it is preferred to form the seam guide 3 by providing a cut or groove of substantial depth, nevertheless, it is apparent that many of the advantages to be derived from the present invention may also be secured by providing simply a shallow cut or scribing mark and such modification is within the scope of the invention.

I claim:

A surface covering of linoleum in strip form provided with a groove of substantial depth inwardly spaced from, but extending along, one edge thereof, said groove forming a seam-cutting knife guide whereby the butt joining of adjacent strips is facilitated.

ROGER K. AUSTIN.